United States Patent
Wallrabe et al.

(10) Patent No.: US 11,772,721 B2
(45) Date of Patent: Oct. 3, 2023

(54) MOTOR VEHICLE WITH A REAR DIFFUSER

(71) Applicant: Dr. Ing. h.c. F. Porsche Aktiengesellschaft, Stuttgart (DE)

(72) Inventors: Sven Wallrabe, Leonberg (DE); Ilya Senchenkov, Stuttgart (DE); Dominik Beierl, Korntal-Münchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 123 days.

(21) Appl. No.: 17/537,874

(22) Filed: Nov. 30, 2021

(65) Prior Publication Data

US 2022/0177057 A1  Jun. 9, 2022

(30) Foreign Application Priority Data

Dec. 4, 2020 (DE) .................. 10 2020 132 244.5

(51) Int. Cl.
*B62D 35/00* (2006.01)
*B62D 35/02* (2006.01)

(52) U.S. Cl.
CPC ........... *B62D 35/007* (2013.01); *B62D 35/02* (2013.01)

(58) Field of Classification Search
CPC ....... B62D 35/007; B62D 35/02; B62D 37/02
See application file for complete search history.

(56) References Cited

U.S. PATENT DOCUMENTS

| | | | |
|---|---|---|---|
| 9,283,999 B2 | 3/2016 | Wolf et al. | |
| 9,469,355 B2 | 10/2016 | Wolf | |
| 9,663,049 B2 | 5/2017 | Weigand et al. | |
| 10,040,493 B2 | 8/2018 | Wolf | |
| 2017/0050684 A1* | 2/2017 | Kim | B62D 35/007 |
| 2019/0009841 A1* | 1/2019 | Wolf | B62D 35/007 |
| 2019/0077469 A1* | 3/2019 | Seon | F01N 13/08 |
| 2020/0353997 A1* | 11/2020 | Ruschman | B62D 37/02 |

FOREIGN PATENT DOCUMENTS

| | | | | |
|---|---|---|---|---|
| DE | 102007002798 A1 | 7/2008 | | |
| DE | 102012014176 A1 | 1/2014 | | |
| DE | 102013105842 A1 | 12/2014 | | |
| DE | 102013105843 A1 | 12/2014 | | |
| DE | 202014010120 U1 | 3/2016 | | |
| DE | 102015118076 A1 | 4/2017 | | |
| DE | 102017114863 A1 | 1/2019 | | |
| FR | 3081820 A1 * | 12/2019 | ........... | B62D 35/007 |
| WO | 2020079263 A1 | 4/2020 | | |

\* cited by examiner

*Primary Examiner* — Lori Lyjak
(74) *Attorney, Agent, or Firm* — RatnerPrestia

(57) ABSTRACT

A motor vehicle has a rear diffuser which includes a diffuser element which can be moved into a diffuser position in order to influence a driving behavior of the motor vehicle in respect of vehicle downforce and air resistance. The diffuser element, in a closed position, covers an opening of a hitch device, which is exposed by the diffuser element in an open position.

11 Claims, 2 Drawing Sheets

MOTOR VEHICLE WITH A REAR DIFFUSER

CROSS-REFERENCE TO RELATED APPLICATION

This application claims priority to German Patent Application No. 10 2020 132 244.5, filed Dec. 4, 2020, the content of such application being incorporated by reference herein in its entirety.

FIELD OF THE INVENTION

The invention relates to a motor vehicle having a rear diffuser which comprises a diffuser element which can be moved into a diffuser position in order to influence a driving behavior of the motor vehicle in respect of vehicle downforce and air resistance. The invention furthermore relates to a method for operating a motor vehicle of this kind.

BACKGROUND OF THE INVENTION

German Laid-Open Application DE 10 2017 114 863 A1, which is incorporated by zo reference herein, discloses a rear diffuser unit having a base element which can be mounted at a fixed location on a body of a vehicle, having a movable diffuser element, and having a drive device, by means of which the diffuser element can be moved relative to the base element between two end positions, wherein the diffuser element is embodied as a box diffuser element, which has two fixed side walls, a fixed rear wall and a fixed base. Further motor vehicles having a rear diffuser are known from international application WO 2020/079263 A1, which is incorporated by reference herein, and German Laid-Open Applications DE 10 2013 105 842 A1, DE 10 2013 105 843 A1 and DE 10 2015 118 076 A1, which are each incorporated by reference herein.

SUMMARY OF THE INVENTION

Described herein is a motor vehicle having a rear diffuser which comprises a diffuser element which can be moved into a diffuser position in order to influence a driving behavior of the motor vehicle in respect of vehicle downforce and air resistance.

The rear diffuser which comprises a diffuser element can be moved into a diffuser position in order to influence a driving behavior of the motor vehicle in respect of vehicle downforce and air resistance, in that, in a closed position, the diffuser element covers an opening of a hitch device, which is exposed by the diffuser element in an open position. According to one aspect of the invention, the diffuser element performs a dual function. On the one hand, the diffuser element serves either way, in a manner similar to conventional diffuser elements, to influence the driving behavior of the motor vehicle in respect of vehicle downforce and air resistance. In addition, the diffuser element, in its closed position, performs a covering function for the opening of the hitch device. Hitch devices are known per se, for example from German Laid-Open Applications DE 10 2007 002 798 A1, which is incorporated by reference herein, and DE 10 2012 014 176 A1, which is incorporated by reference herein. The known hitch devices are provided with cover elements or covers. Furthermore, German Utility Model DE 20 2014 010 120 U1, which is incorporated by reference herein, discloses a covering device for covering in an opening of a bumper for a motor vehicle which can be used as a passage for a removable trailer coupling part or some other attachment. However, in none of the documents relating to hitch devices is a rear diffuser mentioned or the combination with a rear diffuser suggested. On the other hand, in none of the abovementioned documents relating to a rear diffuser is a hitch device mentioned or the combination with a hitch device suggested. The claimed combination of a rear diffuser with a hitch device furthermore permits, on the one hand, manual assembly of a trailer coupling when the diffuser element is open. In addition, the diffuser element, which can preferably be actuated automatically, enables automatic extension of a hitch device integrated into the motor vehicle.

A preferred exemplary embodiment of the motor vehicle is that the hitch device comprises a trailer coupling which can be extended from a passive position through the opening into an active position when the opening is exposed by the diffuser element. In this case, the diffuser element is advantageously functionally coupled to the hitch device. The functional coupling can be achieved by means of a suitable controller, by means of which, for example, a drive device of the diffuser element and a further drive device of the hitch device are controlled.

Another preferred exemplary embodiment of the motor vehicle is characterized in that the diffuser element can be moved beyond its diffuser position into an extended position in order to allow the trailer coupling to be extended. Depending on a pivoting angle of the diffuser element and/or a predetermined ground clearance of the motor vehicle, a movement of the diffuser element beyond its diffuser position into its extended position may only be permitted when the vehicle is stationary. The extension of the trailer coupling preferably takes place as fully automatically as the movement of the diffuser element beyond its diffuser position into its extended position.

Another preferred exemplary embodiment of the motor vehicle is characterized in that the diffuser element can be moved into its diffuser position when the trailer coupling is extended. In this way, the diffuser element can advantageously perform its normal diffuser function even when the trailer coupling is extended. If required, the diffuser element can also be moved into a further diffuser position that deviates from the normal diffuser position when the trailer coupling is extended.

Another preferred exemplary embodiment of the motor vehicle is characterized in that the diffuser element is embodied and arranged in its diffuser position in such a way that the air resistance of the motor vehicle when the trailer coupling is extended is improved. In this way, energy can be saved during operation of the motor vehicle with the trailer coupling extended.

Another preferred exemplary embodiment of the motor vehicle is characterized in that the diffuser element is designed as a box diffuser element with a recess for the extended trailer coupling. In particular, the recess in the box diffuser element is of such a size that, when the diffuser element is in its extended position, the trailer coupling can be automatically extended and also retracted without problems. When the diffuser element is in its closed position, the recess of the box diffuser element is advantageously not visible from the outside.

In a method for operating an above-described motor vehicle, the diffuser element is moved from its diffuser position into its extended position before the trailer coupling is extended. Depending on the embodiment of the motor vehicle and of the diffuser element, it can be predetermined that the trailer coupling can only be extended when the motor vehicle is stationary.

A preferred exemplary embodiment of the method is characterized in that the diffuser element is moved back into its diffuser position when the trailer coupling is extended. In this way, the diffuser element can perform its desired diffuser function normally.

Another preferred exemplary embodiment of the method is characterized in that the diffuser element is moved into its closed position when the trailer coupling is retracted. When the trailer coupling is extended, the diffuser element cannot adopt its closed position. The diffuser element and the trailer coupling are advantageously controlled automatically by means of a suitable controller. The invention may also relate to such a controller or a computer program for such a controller.

The invention furthermore relates to a diffuser element and/or a hitch device, in particular a trailer coupling, for an above-described motor vehicle. The parts mentioned can be treated separately.

Furthermore, the invention also relates to pivotable devices instead of a typical trailer coupling to which a plug-in hitch device can be plugged, as is customary, for example, in the USA and Canada.

BRIEF DESCRIPTION OF THE DRAWINGS

Further advantages, features and details of the invention will be found in the following description, in which various exemplary embodiments of the invention are described in detail with reference to the drawing. In the drawing.

DETAILED DESCRIPTION OF THE INVENTION

FIGS. 1 to 4 illustrate a rear part 2 of a motor vehicle 1 in perspective from the rear. The rear part 2 comprises a rear diffuser 3 having a movable diffuser element 4.

The rear diffuser 3 is an aerodynamic element on the underside of a vehicle body of the motor vehicle 1. The diffuser element 4 can be moved, for example pivoted, in such a way that its angle and/or its clearance with respect to a roadway surface can be changed. As a result, a force is exerted on the motor vehicle 1 by an air flow which flows along the underside of the vehicle. In this way, the driving behavior of the motor vehicle 1 in respect of the vehicle downforce and air resistance can be improved by means of the rear diffuser 3.

Figure 1:
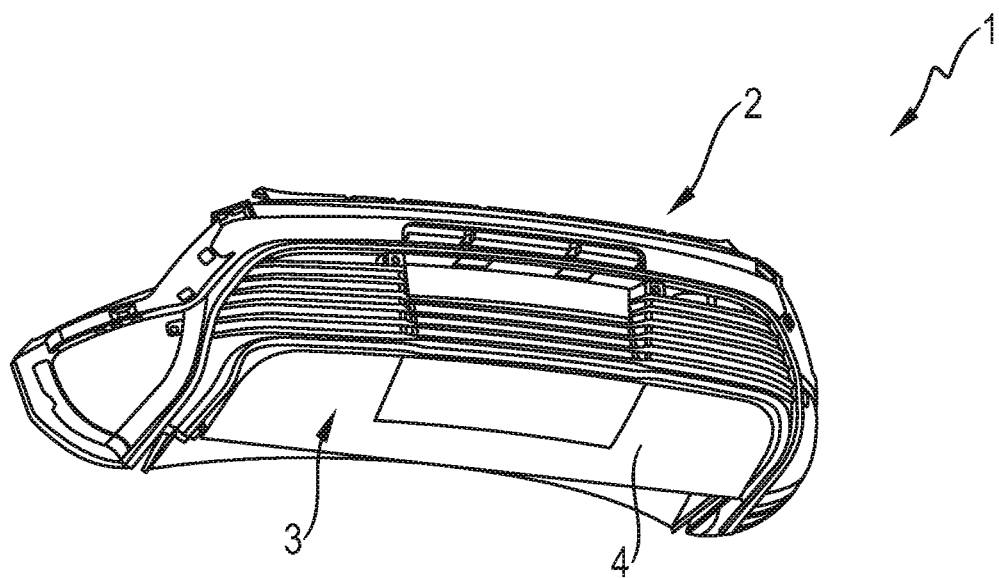
FIG. 1 shows a perspective illustration of a rear part of a motor vehicle having a rear diffuser which comprises a diffuser element, which is in its closed position.

In FIG. 1, the diffuser element 4 is in its closed position. In the closed position, the diffuser element 4 fits into the shape of the underbody on the rear part 2 of the motor vehicle 1.

Figure 2:
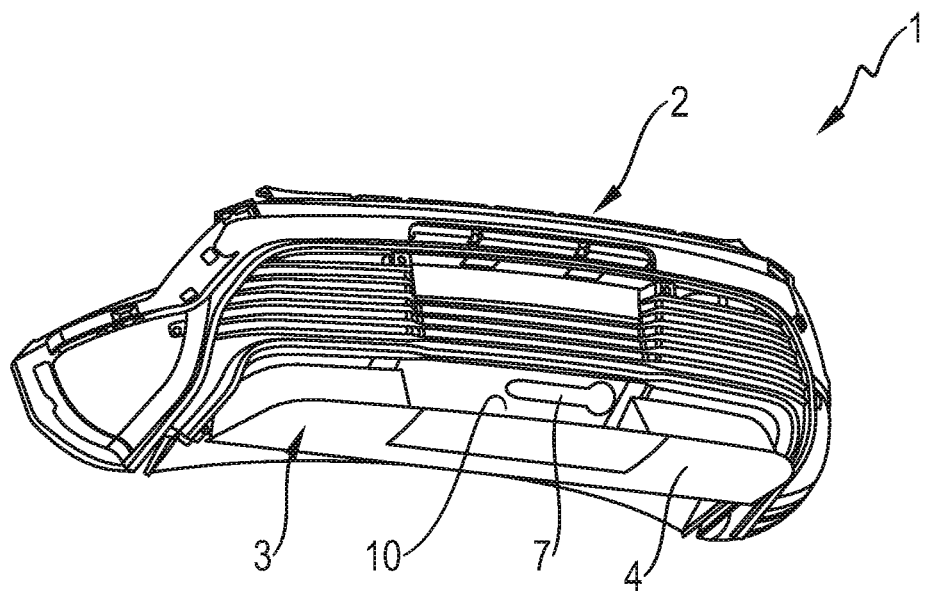
FIG. 2 shows the rear part from FIG. 1 with the diffuser element in its diffuser position.

In FIG. 2, the diffuser element 4 is in its diffuser position. The diffuser element 4 is pivoted downward by a defined angle on the underbody of the rear part 2. It can be seen in FIG. 2 that the diffuser element 4 is embodied as a box diffuser element 9.

Figure 3:
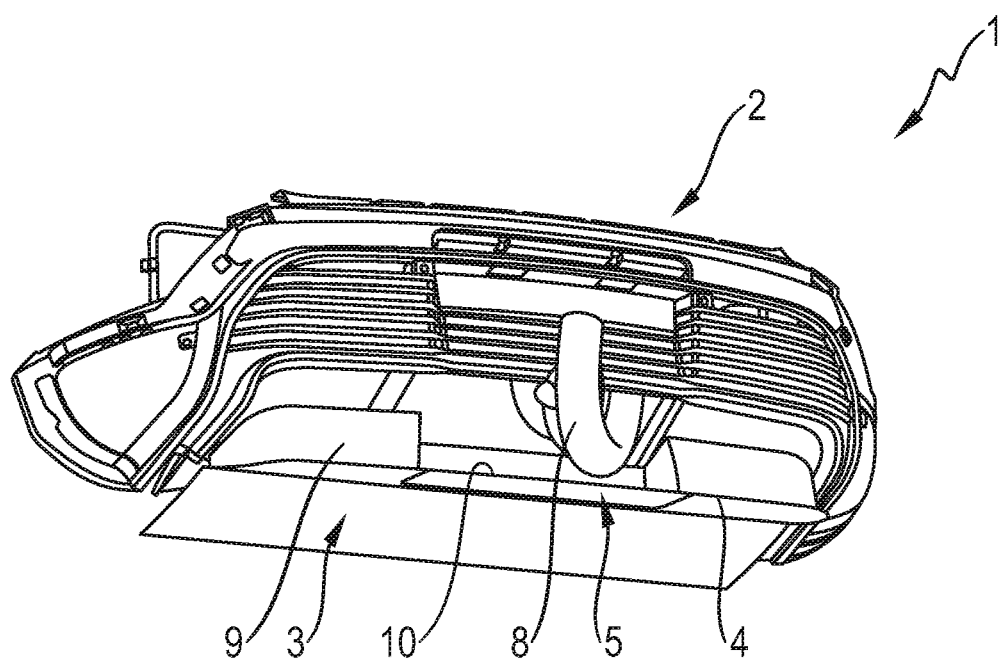
FIG. 3 shows the rear part from FIG. 2 with the diffuser element in its extended position during the extension of a trailer coupling.
Figure 4:
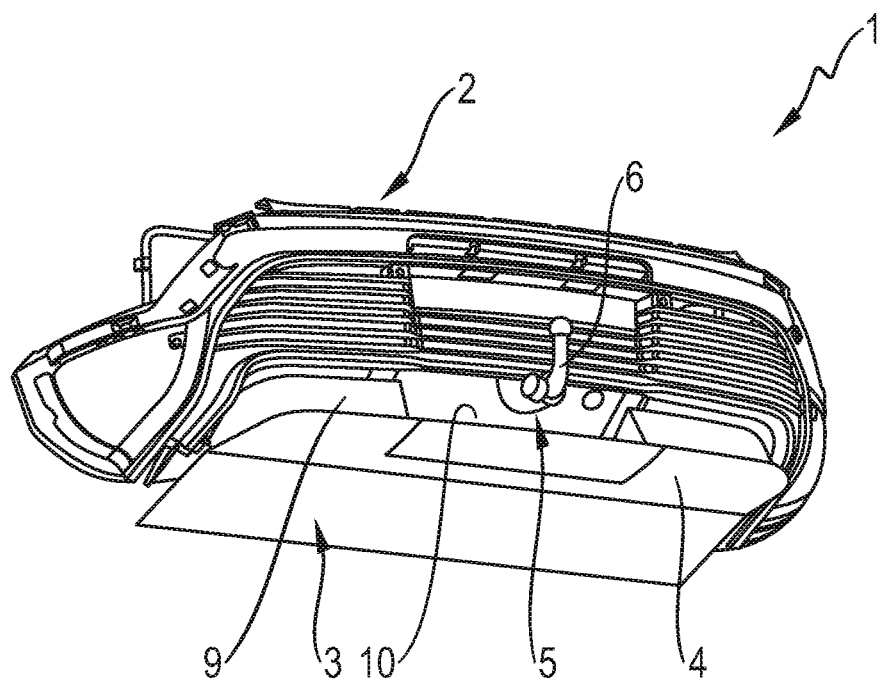
FIG. 4 shows the rear part from FIG. 3 with the trailer coupling extended and the diffuser element in its diffuser position.

In FIG. 2 it can be seen that, in its diffuser position, the diffuser element 4 exposes an opening 7 of a hitch device (5 in FIGS. 3 and 4).

In FIG. 3, a pull-out curve 8 is indicated, which illustrates a movement of a trailer coupling (6 in FIG. 4) during extension through the opening 7.

FIG. 4 shows the trailer coupling 6 in its extended state. In FIG. 4, the diffuser element 4 is in its diffuser position. The diffuser element 4, which is embodied as a box diffuser element 9, has a recess 10 in the region of the extended trailer coupling 6. This advantageously enables the diffuser element 4 to perform its normal diffuser function even when the trailer coupling 6 is extended.

In FIG. 3, the diffuser element 4 has been moved into an extended position beyond its diffuser position, which is illustrated in FIGS. 2 and 4. In its extended position, the diffuser element 4 is pivoted slightly further downward than in its diffuser position. As indicated in FIG. 3 by the pull-out curve 8, this enables the trailer coupling 6 to be extended.

As long as the diffuser element 4 is in its extended position illustrated in FIG. 3, the trailer coupling 6 can be moved from a retracted passive position into its extended active position, and vice versa.

When the trailer coupling 6 is retracted, the diffuser element 4 can adopt its closed position, as shown in FIG. 1. When the trailer coupling 6 is extended, the diffuser element 4 adopts its diffuser position, as shown in FIG. 4.

REFERENCE SIGNS 1 motor vehicle
2 rear part
3 rear diffuser
4 diffuser element
5 hitch device
6 trailer coupling
7 opening
8 pull-out curve
9 box diffuser element
10 recess

What is claimed is:

1. A motor vehicle comprising:
a rear diffuser including a moveable diffuser element that is configured to be moved into a diffuser position in order to influence a vehicle downforce and an air resistance of the motor vehicle,
wherein, in a closed position of the diffuser element, the diffuser element covers an opening of a hitch device, and, in an open position of the diffuser element, the diffuser element exposes the opening of the hitch device.

2. The motor vehicle as claimed in claim 1, wherein the hitch device comprises a trailer coupling which is configured to be extended from a passive position through the opening into an active position when the opening is exposed by the diffuser element.

3. The motor vehicle as claimed in claim 1, the trailer coupling being configured to be extended from a passive position through the opening and into an active position when the opening is exposed by the diffuser element.

4. The motor vehicle as claimed in claim 2, wherein the diffuser element is configured to be moved beyond the diffuser position into an extended position in order to allow the trailer coupling to be extended.

5. The motor vehicle as claimed in claim 4, wherein the diffuser element is configured to be moved into the diffuser position when the trailer coupling is extended.

6. The motor vehicle as claimed in claim 5, wherein the diffuser element is embodied and arranged in the diffuser position to improve the air resistance of the motor vehicle when the trailer coupling is extended.

7. The motor vehicle as claimed in claim 4, wherein the diffuser element is a box diffuser element having a recess for accommodating the extended trailer coupling.

8. In a motor vehicle comprising a rear diffuser including a moveable diffuser element that is configured to be moved into a diffuser position in order to influence a vehicle downforce and an air resistance of the motor vehicle, wherein, in a closed position of the diffuser element, the diffuser element covers an opening of a hitch device, and, in an open position the diffuser element, the diffuser element exposes the opening, a method for operating the motor vehicle comprises:

moving the diffuser element from the diffuser position into an extended position before extending a trailer coupling of the hitch device.

9. The method as claimed in claim 8, further comprising moving the diffuser element back to the diffuser position after extending the trailer coupling.

10. The method as claimed in claim 9, further comprising moving the diffuser element to the closed position after retracting the trailer coupling.

11. A rear diffuser including a moveable diffuser element that is configured to be moved into a diffuser position in order to influence a vehicle downforce and air resistance of a motor vehicle, wherein, in a closed position of the diffuser element, the diffuser element covers an opening of a hitch device, and, in an open position the diffuser element, the diffuser element exposes the opening of the hitch device.

* * * * *